United States Patent [19]

Takei

[11] Patent Number: 5,216,932
[45] Date of Patent: Jun. 8, 1993

[54] X-Y DRIVE APPARATUS

[75] Inventor: Seiji Takei, Yokohama, Japan

[73] Assignee: Nippon Thompson Co., Ltd., Tokyo, Japan

[21] Appl. No.: 799,493

[22] Filed: Nov. 27, 1991

[30] Foreign Application Priority Data

Nov. 30, 1990 [JP] Japan .................. 2-126630[U]

[51] Int. Cl.$^5$ .................. G05G 11/00; F16H 25/20
[52] U.S. Cl. ................ 74/479 R; 74/89.14; 248/657; 248/913
[58] Field of Search ........... 74/479, 425, 89.14, 74/89.13, 16; 108/143; 248/656, 657, 913

[56] References Cited

U.S. PATENT DOCUMENTS

| | | | |
|---|---|---|---|
| 3,381,539 | 5/1968 | Ovshinsky | 74/89.14 |
| 4,113,223 | 9/1978 | Kakizaki | 108/143 X |
| 4,270,404 | 6/1981 | Murakoshi et al. | 74/479 |
| 4,328,713 | 5/1982 | Lund | 74/89.14 X |
| 4,341,128 | 7/1982 | Murakoshi et al. | 74/479 |
| 4,378,709 | 4/1983 | Chitayat | 108/143 X |
| 4,409,860 | 10/1983 | Moriyama et al. | 108/143 X |
| 4,729,536 | 3/1988 | Scala | 108/143 X |
| 4,953,418 | 9/1990 | Hirose | 108/143 X |
| 4,995,277 | 2/1991 | Yanagisawa | 248/657 X |
| 5,036,723 | 8/1991 | Matsumoto | 74/479 |
| 5,040,431 | 8/1991 | Sakino et al. | 74/479 |
| 5,092,193 | 3/1992 | Yanagisawa | 74/479 |

FOREIGN PATENT DOCUMENTS 2-225857 9/1990 Japan .................. 74/479

Primary Examiner—Leslie A. Braun
Assistant Examiner—Andrea Pitts
Attorney, Agent, or Firm—Skjerven, Morrill, MacPherson, Franklin & Friel

[57] ABSTRACT

An X-Y drive apparatus includes an X drive unit mounted on a stationary base and a Y drive unit mounted on an X table of the X drive unit. The X drive unit includes a first motor operatively coupled to the X table and a second motor operatively coupled to a splined shaft. A worm gear is mounted on the splined shaft such that the worm gear may move along the splined shaft slidably, but it does not rotate around the splined shaft. The Y drive unit includes a Y table and a ball screw which is operatively coupled to the Y table and which has a worm wheel in mesh with the worm gear.

2 Claims, 6 Drawing Sheets

X-Y DRIVE APPARATUS

BACKGROUND OF THE INVENTION

1. Field of the Invention

This invention generally relates to a driving apparatus for driving to move an object in a desired direction, and, in particular, to an X-Y drive apparatus for driving to move an X-Y table suitable for use in a system for automatically mounting various electronic components and the like on a circuit board.

2. Description of the Prior Art

An X-Y drive apparatus is well known in the art and such a typical prior art X-Y drive apparatus is illustrated in FIGS. 2 through 4. FIG. 2 shows in perspective view a typical prior art X-Y table drive apparatus including an X table drive unit 1 and a Y table drive unit 2. The X and Y table drive units 1 and 2 are identical in structure excepting the fact that they are placed one on top of another oriented perpendicular to each other. In this structure, the X table drive unit 1 is fixedly mounted on a base (not shown) and the Y table drive unit 2 is mounted on the X table drive unit 1 such that the Y table drive unit 2 may move in the X direction back and forth.

As shown in FIG. 4, each of the X and Y table drive units 1 and 2 includes a bed 3 having a generally U-shaped cross sectional shape, and a pair of side plates 4a and 4b is fixedly attached to the both sides of the bed 3 extending vertically upward. The bed 3 are elongated in shape horizontally, as are the side plates 4a and 4b. As shown in FIG. 3, a motor 5 and a connector 6 for the motor and sensors are fixedly mounted at one end of the bed 3 through a fixture member 7. A stationary bearing member 8 including a bearing 8' for rotatably supporting one end of a ball screw unit 10 is fixedly attached at the opposite end of the bed 3. The motor 5 is operatively coupled to the ball screw unit 10 through a coupling unit 9. The ball screw unit 10 includes a male screw 11, a female screw (not shown) of a nut 16 and a plurality of balls (not shown) interposed between them.

As shown in FIG. 3, the male screw 11 has one end rotatably supported by the stationary bearing member 8 through the bearing 8' and the opposite end of the male screw 11 has an integrally formed shaft section 11a which is rotatably supported by a stationary bearing 14 in a bearing unit 12. The movement of the shaft section 11a in the axial direction may be limited by eliminating the clearance in the stationary bearing 14 in the axial direction by tightening a bearing nut 13, and since the shaft section 11a is operatively coupled to the coupling unit 9, a rotatational force may be transmitted from the motor 5.

The nut 16 whose female screw is in engagement with the male screw 11 through balls (not shown) is fixedly attached to a table 17 having a generally T-shaped cross section as shown in FIG. 4. The table 17 is formed with a pair of projections 17a which project upwardly beyond the top end of the side plates 4a and 4b. These projections 17a serve to support thereon the Y table drive unit 2. A stopper 18 having a predetermined length is fixedly attached to one end surface of the table 17 so as to limit the movement of the table 17 in the axial direction. A pair of sliders 19, each having a generally inverted-U-shaped cross section, is fixedly attached to the bottom surface of the table 17 and these sliders 19 are slidably mounted on a pair of guide rails 15 which are mounted on respective mounting surfaces 3a of the bed.

The bed 3 is formed with a pair of sensor mounting grooves 20 in which sensors 51a and 51b are mounted for detecting the position of the table 17 relative to the rails 15. As shown in FIG. 3, a plurality of cover positioning grooves 22 are provided for positioning a top cover 21, and, as shown in FIG. 4, a plurality of cover positioning grooves 50 are provided for positioning the side plates or covers 4a and 4b.

In operation, upon power up, power is supplied from an external source through the connectors 6 of the respective X and Y table drive units 1 and 2 to the respective motors 5 and the various sensors 51a and 51b mounted in the sensor mounting grooves 20. When the power supply voltage is applied to the motor 5 of X table drive unit 1, the motor 5 is driven to rotate so that a rotating force is transmitted to the ball screw unit 10 through the coupling unit 9. Since the male screw 11 of the ball screw unit 10 rotates, the nut 16 and thus the table 17, to which the nut 16 is fixedly attached, moves longitudinally along the guide rails 15. Since the table 17' of Y table drive unit 2 may move in the Y direction independently from the X table drive unit 1, the table 17' of Y table drive unit 2 may be driven to move in any direction in a plane defined by the X and Y axes by controlling the operation of the motor 5 of each of the X and Y table drive units 1 and 2 via a control circuit (not shown).

However, in the above-described prior art X-Y drive unit, since the Y table drive unit 2 is mounted on the X table drive unit 1, a motor having a larger capacity must be used for the motor 5 of the X table drive unit 1, which is disadvantageous since the overall structure tends to become bulky and the speed of operation tends to be limited. In addition, in view of the added weight, the ball screw unit 10 must be carefully designed to have a sufficient rigidity and an optimal diameter. Moreover, since the motor 5 of Y table drive unit 2 executes a linear motion together with the Y table drive unit 2, a cord or line connected to the connector 6 also moves, so that a care must be exercised not to get such a cord or line tangled or cut during operation.

SUMMARY OF THE INVENTION

In accordance with the present invention, there is provided an improved X-Y drive apparatus which comprises a first drive unit including a first table which is movable back and forth along a first axis and a second drive unit fixedly mounted on the first table and including a second table which is movable back and forth along a second axis different from the first axis.

The first drive unit includes a first drive source operatively coupled to the first table for driving to move the first table in the first direction and a second drive source. The second table is operatively coupled to the second drive source through a coupling means so that the second table is driven to move in the second direction when a driving force is applied thereto from the second drive source.

In a preferred embodiment, each of the first and second drive sources includes a motor. A first drive shaft which is driven to rotate by the first motor is provided in the first drive unit as operatively coupled to the first table. Preferably, a splined shaft is coupled to the motor shaft of the second motor and a first engaging means is mounted on the splined shaft slidably but to rotate in unison. A second drive shaft operatively coupled to the second table is provided in the second drive unit such that the second table moves in the second direction when the second drive shaft is driven to rotate. A second engaging means is fixedly mounted on the second drive shaft and the second engaging means is in power transmitting relation with the first engaging means so that a rotating power can be transmitted from the splined shaft to the second drive shaft.

Therefore, it is a primary object of the present invention to provide an improved X-Y drive apparatus compact in size, high in performance and reliable in operation.

Another object of the present invention is to provide an improved X-Y drive apparatus fast in operation and low in cost.

Other objects, advantages and novel features of the present invention will become apparent from the following detailed description of the invention when considered in conjunction with the accompanying drawings.

BRIEF DESCRIPTION OF THE DRAWINGS

FIG. 1b a schematic illustration showing in exploded view the detailed structure of the power transmitting mechanism between the X and Y drive units in the structure shown in FIG. 1a;

FIG. 1c is a schematic illustration showing in transverse cross section the X table unit employed in the structure shown in FIG. 1a;

DESCRIPTION OF THE PREFERRED EMBODIMENTS

Figure 1A:
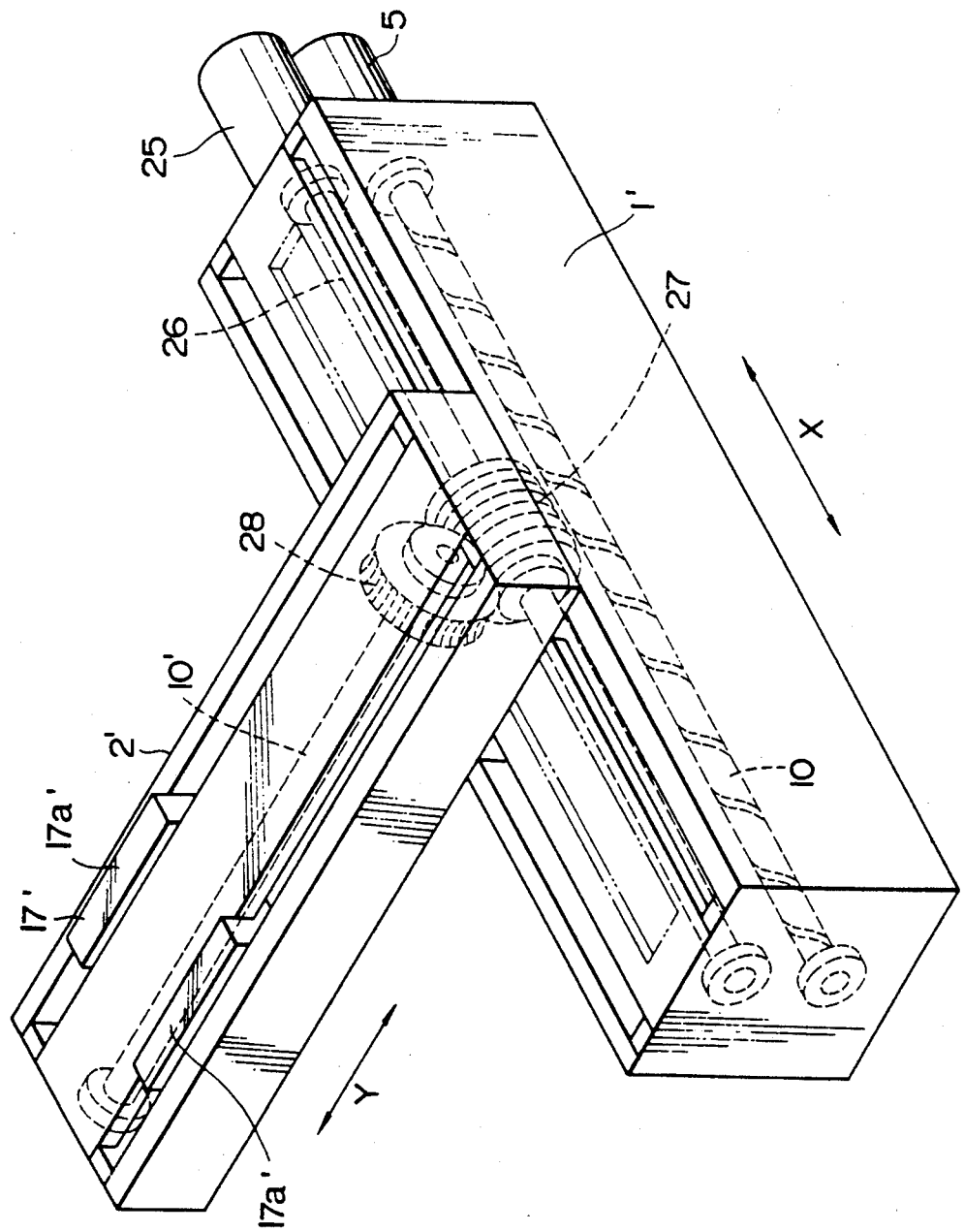
FIG. 1a is a schematic illustration showing in perspective view an X-Y drive apparatus constructed in accordance with one embodiment of the present invention.
Figure 4:
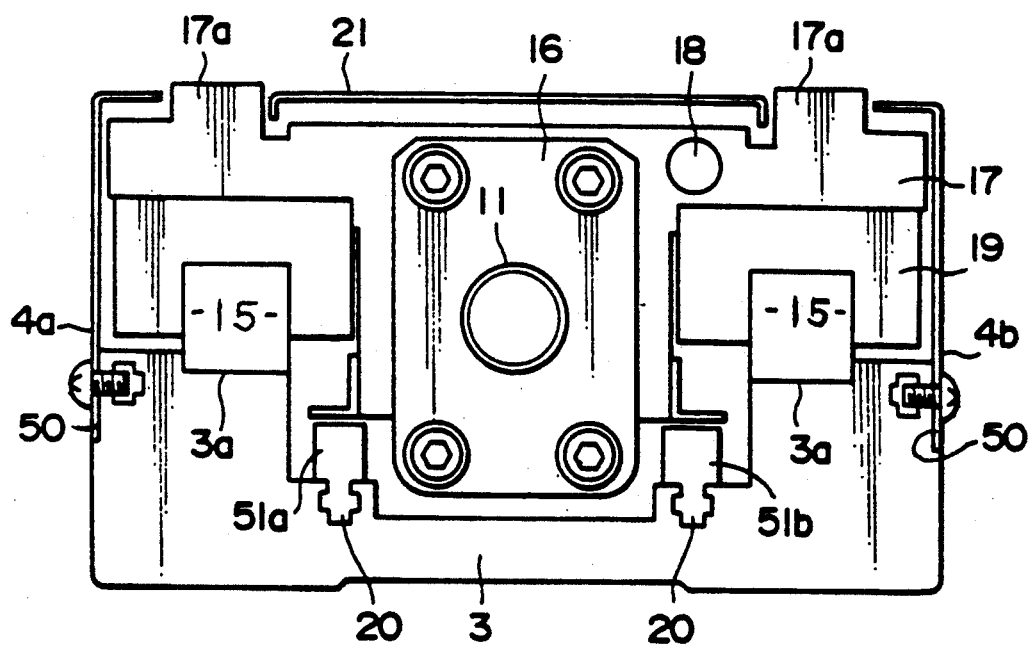
FIG. 4 is a schematic illustration showing in transverse cross section taken along line I-I indicated in FIG. 3.
Figure 2:
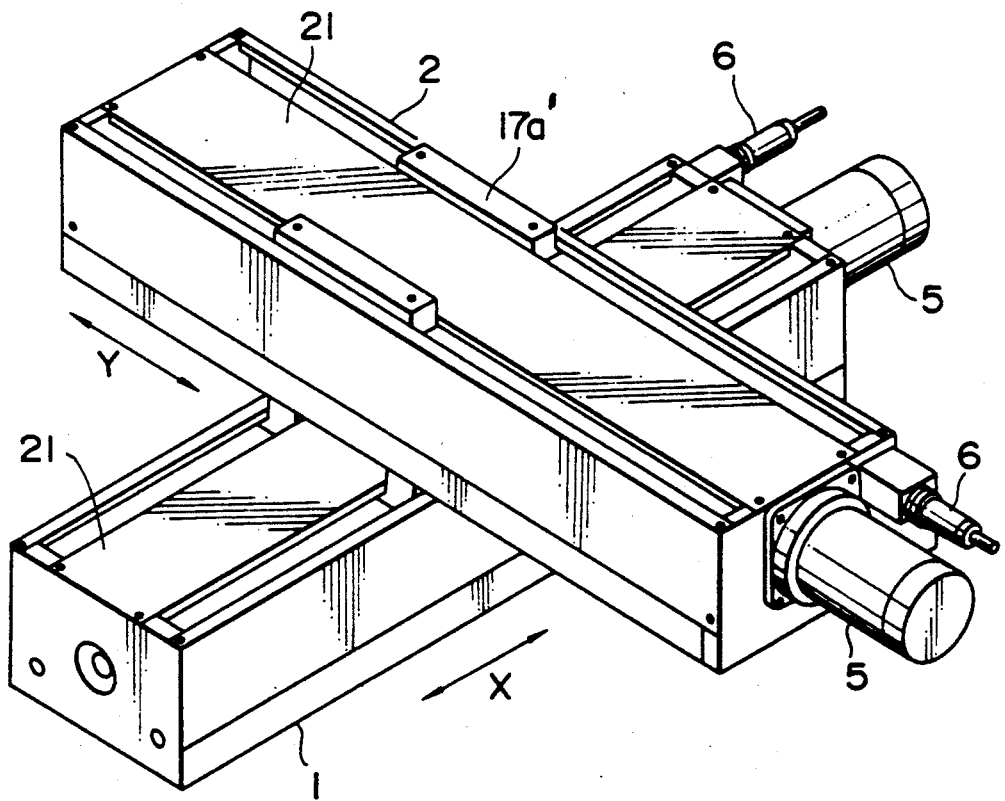
FIG. 2 is a schematic illustration showing in perspective view a typical prior art X-Y drive apparatus.
Figure 3:
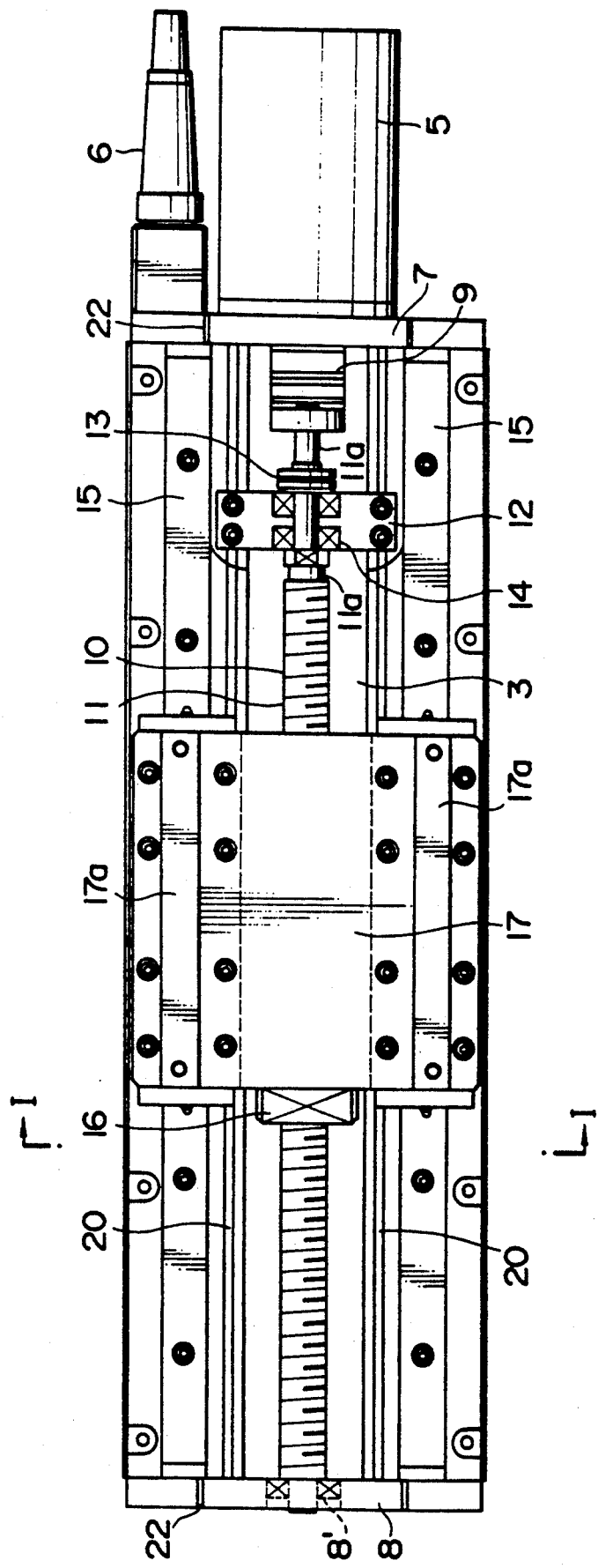
FIG. 3 is a schematic illustration showing in plan view on a somewhat enlarged scale the detailed structure of either of X and Y drive units provided in the structure shown in FIG. 2.

Referring now to FIG. 1a, there is schematically shown an X-Y drive apparatus constructed in accordance with one embodiment of the present invention. The illustrated X-Y drive apparatus is similar in certain respects to the X-Y drive apparatus shown in FIGS. 2 through 4 and thus like elements are indicated by like numerals without repeating the explanation as much as possible.

As shown in FIG. 1a, the present X-Y drive apparatus includes an X drive unit 1' which is mounted on a desired object, such as a base (not shown), and a Y drive unit 2'. The X drive unit 1' includes X table 17 (FIG. 1b) which is provided to be movable back and forth along the X direction back and forth, and the Y drive unit 2' is fixedly mounted on the X table 17. As a result, the Y drive unit 2' as a whole may move along the X direction back and forth. The Y drive unit 2' on the other hand includes a Y table 17' which is provided to be movable back and forth the Y direction, so that the Y table 17' may move in any direction in a plane defined by the X and Y axes.

The X drive unit 1' includes a first motor 5 which is disposed at one end of an elongated housing of the X drive unit 1'. Also provided in the X drive unit 1' is a first drive shaft 10 which is operatively coupled to the motor shaft of the first motor 5, so that the first drive shaft 10 rotates when the first motor 5 is driven to rotate. The first drive shaft 10 preferably is a ball screw which is operatively coupled to a nut (not shown) fixedly attached to the X table 17 through balls in a manner similar to the structure shown in FIG. 3. As a result, when the first drive motor 5 is driven to rotate, the first drive shaft or ball screw 10 rotates to cause the X table 17 to move linearly in the X direction. In this case, since the Y drive unit 2' is supported on the X table 17, the Y drive unit 2' as a whole also moves in the X direction.

Figure 1B:
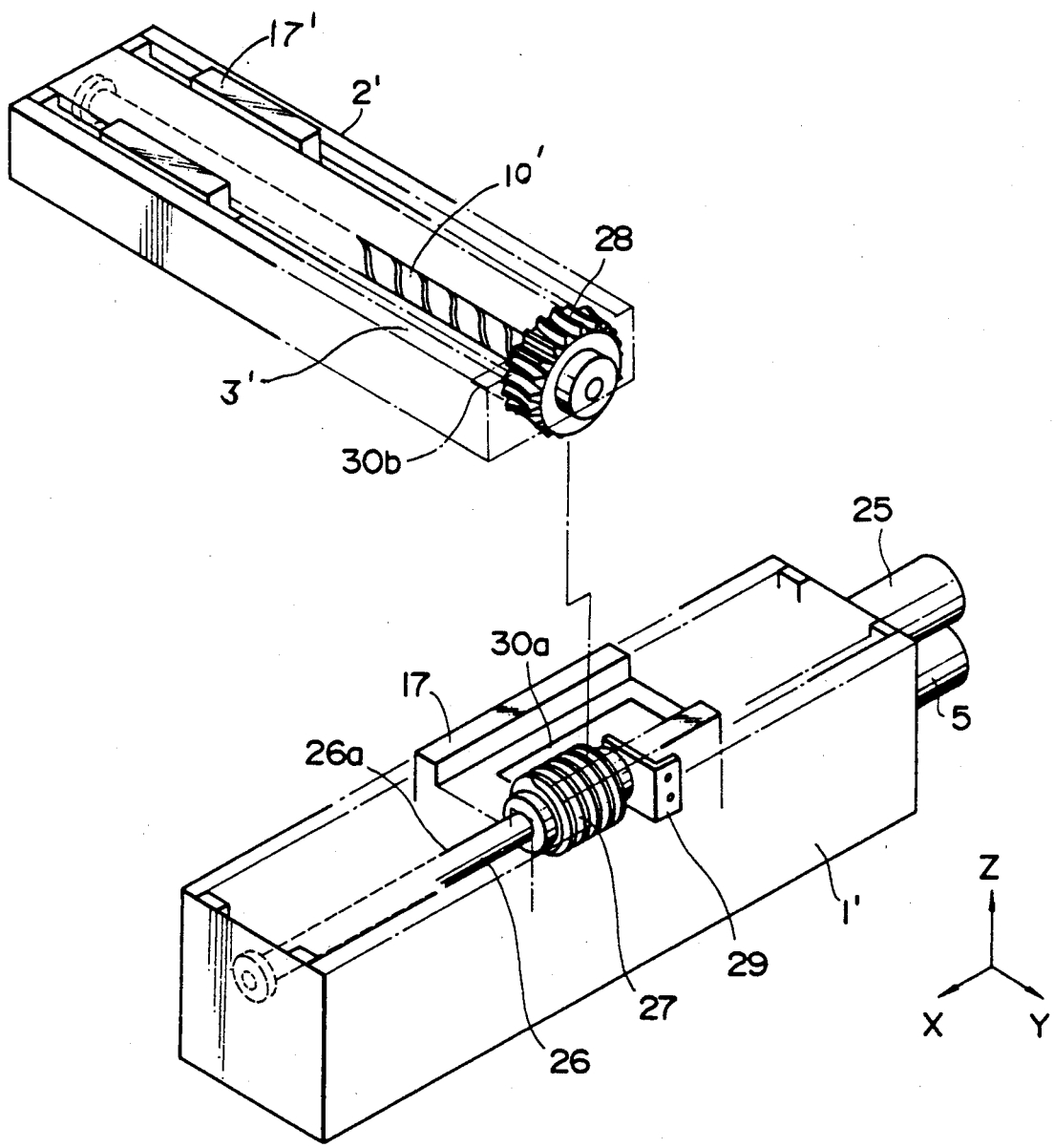
Figure 1C:
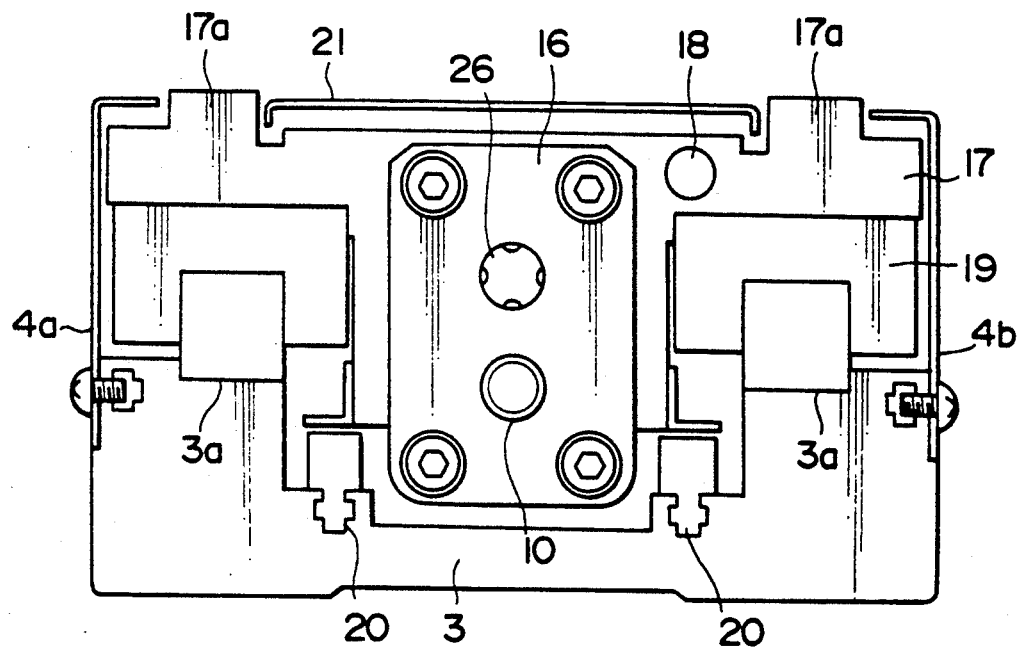

Of importance, the X table 1' also includes a second motor 25, which, in the illustrated embodiment, is disposed above the first motor 5. The first drive unit 1' further includes a splined shaft 26 disposed above and in parallel with the first drive shaft 10. The splined shaft 26 is operatively coupled to a motor shaft of the second motor 25 so that the splined shaft 26 rotates when the second motor 25 is driven to rotate. In the present embodiment, as best shown in FIG. 1b, a worm gear 27 is mounted on the splined shaft 26 such that the worm gear 27 may move slidably along the splined shaft 26 but the worm gear 27 does not rotate around the splined shaft 26. Preferably, in the present embodiment, the splined shaft 26 has at least one spline groove 26a extending in the longitudinal direction and the worm gear 27 has a through-hole with an inwardly extending projection which may be fitted into the spline groove 26a when assembled. With this structure, the worm gear 27 may slidably move along the splined shaft 26, but the worm gear 27 is not permitted to rotate around the splined shaft 26.

As shown in FIG. 1b, the X table 17 is generally rectangular in shape and a rectangular opening 30a is formed at its center, and the worm gear 27 is located and partly received in the opening 30a of the X table 17. A U-shaped pressure plate 29 is fixedly attached at one end to the X table 17 as shown in FIG. 1b. The free end of the pressure plate 29 is in contact with one end of the worm gear 27 so as to normally apply a biasing force to the worm gear 27 in a positive X direction so as to keep the worm gear 27 always in mesh with an associated worm wheel 28 which is fixedly mounted on a second drive shaft 10' of the Y drive unit 2' In order to establish such a mesh between the worm gear 27 and the worm wheel 28, as shown in FIG. 1b, an opening 30b is provided in the bed 3' of the Y drive unit 2' at one end thereof, and the worm gear 27 is partly received in the opening 30b to be in mesh with the worm wheel 28.

The second drive shaft 10' is also preferably a ball screw which is operatively coupled to a nut (not shown) fixedly attached to the Y table 17'. Thus, when the second drive shaft 10' rotates as driven by the second motor 25 through a mesh between the worm gear 27 and the worm wheel 28, the Y table 17' with its projections 17a' moves in the Y direction.

Therefore, when the first motor 5 alone is driven to rotate, the first drive shaft 10 rotates to move the Y drive unit 2' as a whole along the X direction. The direction of movement of the Y drive unit 2' in this case, of course, is governed by the direction of rotation of the first drive shaft 10 or for that matter the first motor 5. On the other hand, if the second motor 25 alone is driven to rotate, its rotationary force is transmitted to the second drive shaft 10' via the splined shaft 26, worm gear 27 and worm wheel 28, so that the Y table 17' is caused to move in the Y direction. In this case also, the direction of linear motion of the Y table 17 depends on the direction of rotation of the second motor 25. Accordingly, when the first and second motors 5 and 25 are driven to rotate at the same time, the Y drive unit 2' as a whole is caused to move in the X direction and at the same time the Y table 17' is caused to move in the Y direction, so that the Y table 17' moves in a direction having X and Y components. Thus, it should be understood that the Y table 17' may move in any desired direction in a plane defined by X and Y axes. Although X and Y directions may be set in any desired manner, X and Y directions are preferably set perpendicular to each other.

As described above, in accordance with the present invention, the Y drive unit 2', which is carried on the X table 17 of the X drive unit 1', does not carry a drive source, such as a motor, so that the weight of the Y drive unit 2' is minimized. As a result, the first motor 5 does not need to have an increased capacity.

It is to be noted that, in the above-described embodiment, although use has been made of a worm gear and worm wheel combination as a power transmitting mechanism between the splined shaft 26 and the second drive shaft 10', use may be made of any other form of power transmitting mechanism as long as a rotating force may be transmitted from the splined shaft 26 to the second drive shaft 10'. For example, use may be made of bevel gears for that purpose.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An X-Y drive apparatus, comprising:
   a first drive unit mounted on a stationary object, said first drive unit including a first drive source, a first table operatively coupled to said first drive source and provided to be movable back and forth along a first axis;
   a second drive source;
   a second drive unit mounted on said first table, said second drive unit including a second table provided to be movable back and forth along a second axis, different from said first axis;
   a coupling means for operatively coupling said second drive source to said second table; and
   wherein said coupling means includes a splined shaft provided in said first drive unit and operatively coupled to said second drive source, a first engaging means mounted on said splined shaft such that said first engaging means slidably moves along said splined shaft but does not rotate around said splined shaft, a second engaging means in power transmission engagement with said first engaging means, and a drive shaft which is provided in said second drive unit and operatively coupled to said second table, said second engaging means fixedly mounted on said drive shaft.

2. The apparatus of claim 1, wherein said first engaging means includes a worm gear and said second engaging means includes a worm wheel.

* * * * *